Figure 3:
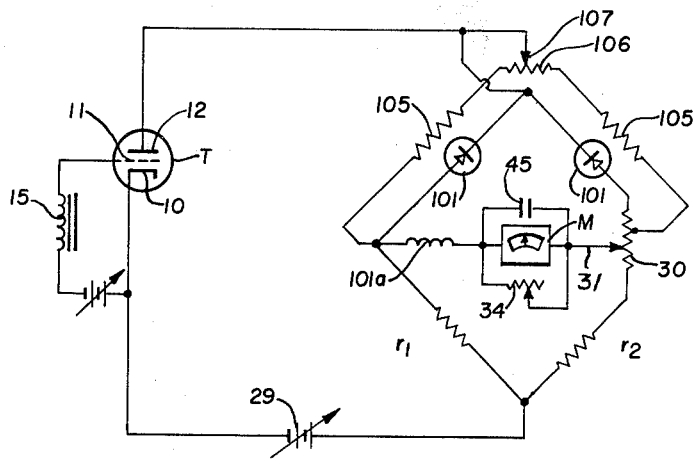

Oct. 12, 1965         D. S. WISE ETAL         3,211,995
        METHOD AND APPARATUS FOR MEASURING AN ALTERNATING
              CURRENT COMPONENT IN A CIRCUIT HAVING
                    A DIRECT CURRENT COMPONENT
Filed Oct. 22, 1956                            2 Sheets-Sheet 1

SECONDARY WINDINGS 15, 20, 32, 32a-f, 100 AND 101a ARE ALL ENERGIZED IN SYNCHRONISM WITH EACH OTHER

Fig. 1

Fig. 2

INVENTORS,
DAVID S. WISE
GEORGE E. SUTLIFF
BY
J. D. Douglas their ATTORNEY

INVENTORS,
DAVID S. WISE
GEORGE E. SUTLIFF

United States Patent Office 3,211,995
Patented Oct. 12, 1965

3,211,995
METHOD AND APPARATUS FOR MEASURING AN ALTERNATING CURRENT COMPONENT IN A CIRCUIT HAVING A DIRECT CURRENT COMPONENT
Davis S. Wise, Cleveland, and George E. Sutliff, Mentor, Ohio, assignors to The Hickok Electrical Instrument Company, Cleveland, Ohio
Filed Oct. 22, 1956, Ser. No. 617,420
24 Claims. (Cl. 324—24)

This invention relates to improvements in electronic circuits of the switching variety which are particularly useful in apparatus for testing of vacuum tubes and more particularly to a dynamic mutual conductance tube tester although the broader aspects of the invention lend themselves to uses other than those particularly described as will become apparent to those versed in the art.

It has become common practice to measure the dynamic characteristics of tubes in terms of mutual conductance. Such a system is illustrated in the Barnhart Patent No. 1,999,858 and an improvement thereof in the copending application of Walter Weiss and David Wise, Serial No. 543,344, filed October 28, 1955, now Patent No. 2,903,644, owned by the same assignee as this application. Briefly, the prior devices applied an alternating potential to the grid of a tube under test and the alternating current output of the tube was measured by a bridge circuit on the basis of the ratio of change in plate current to change in grid voltage. The anode voltage to the tube under test was supplied through a rectifier tube of the 83 type, the anodes each being connected in a leg of a bridge circuit which legs were supplied with alternating current potential of opposite phase by commonly energized secondary windings. The cathode return to the tube under test was through unilateral conducting devices and a meter of the galvanometer type was connected across the ends of the secondarys to measure the current flowing. The conducting devices alternately supplied current to the anodes of the rectifier tube and the difference in the current supplied, which was a measure of Gm, was measured by the meter.

Although the prior devices were highly satisfactory and gave a much better and quicker indication of tube condition than conventional static characteristic measuring devices, there were certain conditions present that were undesirable and which the present invention corrects.

One of the principal difficulties of the prior art devices was the inability to quickly and easily balance the rectifier tube so that the resistance in each leg of the bridge circuit was the same.

Another disadvantage resided in the fact that the output from the tube under test, due to the inherent character of the voltage applied to the anode, was not a steady direct current voltage and, therefore, the gm measurement was a compromise and not a truly accurate measurement, although it was sufficiently accurate to give a good indication of the tube condition.

The above deficiencies were more greatly aggravated when it came to making measurements on tubes which operated in low voltage and current ranges, which tubes have come into prominent usage in present day circuitry.

Another disadvantage occurred because certain of the tubes under test were operated at their threshold of conductance and the conductance at that point was not a straight line response but was curved. By the present invention a bias is provided which eliminates this trouble at the threshold.

By the present invention it is possible to apply a voltage to the anode of the tube under test which is a direct current voltage with a minimum amount of ripple and wherein the voltage may be made constant at the anode in the presence of normal tube currents. It is also possible to isolate the alternating current output of the tube, which is indicative of mutual conductance when the grid is swung by an alternating current signal, from the steady or static current of the tube thus assuring that a more accurate measurement may be realized. It is further possible to provide a meter that is less sensitive than normally used and still enable the measurement of very small currents with a high degree of accuracy by, in effect, causing all of the alternating current output to flow through the meter and by-passing the direct currents around the meter so that the direct current component has no effect on its operation.

Furthermore, by the present invention it is possible to eliminate errors in readings by providing a balancing of certain portions of the circuit to reduce to a minimum the inequalities of resistance that are normally present in certain of the critical components.

Still other advantages of the invention, and the invention itself, will become more apparent from the following description of some embodiments thereof, which description is illustrated by the accompanying drawings and forms a part of the present specification.

In the drawings:

FIG. 1 is a schematic view of a circuit useful in a dynamic mutual conductance tube tester; and FIGS. 2 to 5 inclusive, are schematic views of modifications of the invention.

Briefly, the present invention is a vast improvement over the prior art in that a steady source of direct current potential may be used to supply the anode of the tube under test with the propor operating voltage. The alternating current output of the tube together with the steady static current is passed through a bridge circuit which functions to connect the anode supply voltage to the tube under test, separate the static current from the alternating current and to measure the alternating current. The term "bridge" is used herein in the sense of circuit configuration and in its broader rather than specific sense although in some aspects of the invention it does have the specific operation of a true bridge circuit.

In its broader aspect the invention contemplates supplying a steady direct current voltage at the proper potential, for the anode supply of the tube under test, to one end of a bridge circuit; controlling the flow of current supply through the circuit by an alternating voltage which causes the current to flow through first one leg and then the other in synchronism with the signal on the grid of the tube under test; and measuring the difference in the alternating current component through the different legs by a meter disposed across the bridge. The meter may be calibrated directly in micromhos.

More specifically, as can be seen by viewing FIG. 1, the tube under test is indicated at T. Although it is shown as a simple triode it will be appreciated that any type of vacuum tube, where mutual conductance is a measure of its value, may be tested by this circuit and that a triode is merely shown by way of example and not by way of limitation. The tube may have a cathode 10 or filamentary cathode heated in the usual manner not shown, and includes a control grid 11 and the usual anode 12. An alternating current signal is applied to the input terminals 10 and 11 by the secondary 15 of a transformer. A direct current bias 16 may be disposed in series with the transformer 15 and the cathode, and, a switch 17 is provided so that the bias may be supplied directly to the grid for certain types of measurements as described in the copending application. Likewise a winding 20 is provided which may be inserted in the anode circuit by a switch 21, when it is desired to measure the plate A.C. resistance. The switches 17 and 21 may be ganged together, and are shown in the position for measuring mutual conductance.

The invention herein relates largely to the improvement in the measuring circuit.

The measuring circuit as well as the circuit supplying anode voltage to the tube under test includes, at the upper end, the cathode sections 25 and 25a of a pair of diodes which may be in a single envelope and be vacuum tubes or some other kind of rectifying device such as a semiconductor device. We have found a rectifier of the 1N91 type is satisfactory. In the interest of expediency these devices will hereinafter be referred to broadly as rectifiers having anode and cathode elements. They are disposed in two adjacent legs of the bridge and at their point of junction are connected to the anode of the tube under test. The anode ends 26 and 26a of the rectifiers connect to the cathodes 27 and 27a of two rectifiers disposed in the other legs of the bridge. The anode 26 and cathode 27 connect directly together through a low resistance 30. The anodes 28 and 28a of the rectifier connect together and to a variable direct current supply 29 the negative return of which is connected to the cathode 10 of the tube under test. This supply should be a constant voltage supply of the regulated type such that there is no voltage drop in the presence of normal currents.

A swinger 31 on the resistance 30 connects to one terminal of a meter M the other terminal of which connects through an alternating current winding 32 to the junction of the connection of the anode 26a and cathode 27a. The meter is shunted by a variable resistor 34 which comprises a sensitivity control for the meter, and is also shunted by a condenser 45 which serves as a bypass for the steady direct current component which has been converted to alternating current within the bridge and which may be applied to one side or the other of the meter. The condenser also has an impedance shunting effect on the meter which reduces the internal impedance of the bridge circuit and has a steadying influence on the meter indication.

It should be borne in mind that one of the functions of the bridge circuit is to supply a voltage to the anode of the tube under test. Another function of the circuit is to provide a return path, to the cathode of the tube under test, for the change in plate current on the tube under test and at the same time to increase the sensitivity of the circuit by causing all of the changes in plate current from the tube under test to flow through the meter.

As previously noted there are several things that detract from absolute accuracy in a measuring circuit of this character. Among those may be considered the variable value of applied plate voltage. Heretofore the applied voltage has been a rectified sine wave. In this circuit the voltage is applied by the direct current potential source 29.

This voltage is supplied to the two lower legs of the bridge rectifiers and from these to the rectifiers in the upper legs and thence to the anode. It can be seen therefore that for a certain fixed grid voltage on the tube under test, there will be a certain steady current through the bridge, which if all the parts thus described were equally matched would divide one portion going through the rectifiers 25a–26a and 27–28 and the other portion through the other rectifiers 25–26 and 27a–28a–. In this case the current would be divided equally as to the time of flow. There would also be an equal division of the time of the current flow in event of a fluctuating signal on the grid.

Therefore, means is provided to cause the alternating current developed in the plate circuit of the tube under test, in the presence of an alternating current signal on the grid, to flow, first on the positive excursions through, the rectifier 25a–26a, across the bridge through the meter and then through the rectifier 27–28 and to the power supply in the presence of the voltage excursion of the grid in one direction, and, when the voltage on the grid goes in the other direction to cause the current to flow through the leg 25–26, then the meter in the other direction and finally the rectifier 27a–28a and thence to the power supply.

This is effected by inserting a signal, which is in synchronism with the grid signal, in the bridge circuit in such a manner that it alternately biases the rectifiers to provide the conducting paths as described.

The current outside of the bridge consists of a direct current which varies in amplitude but does not drop to zero and therefore is a direct current with an alternating current component.

The two diodes in the upper legs are gated off and on in timed relation to the alternating current and may be gated synchronously with the alternating current. This causes the composite current to be applied first to one side and then to the other side of the condenser-meter combination across the bridge. Thus if the upper right leg is conductive, current flows from right to left through the condenser-meter combination. When the upper left leg is conducting, current flows from left to right through the condenser-meter combination. If the upper right leg is gated on, as it may be by the gating voltage which is of the same frequency and phase as the exciting voltage for the grid, the current being applied to the right side starts at a predetermined value, rises to a peak and then goes back to that value and then stops. Instantaneously the current is switched to the other side, starts at a certain value, then drops to a predetermined value and then rises to the place where it started and then stops. This switching of the current first to one side and then the other, is within the time of one complete cycle of the A.-C. component.

Since the current is applied to the meter and condenser first in one direction and then the other, the current is thus converted to alternating current. At the same time the alternating component being applied on the positive half of the cycle to the right side of the meter where it goes from right to left through the meter and on the negative half of the cycle to the other side where it goes from left to right, appears to the meter as alternating current which causes the meter to deflect if there is a change in the average value of the direct current flowing in the tube. It therefore now measures this current and reads it as the average difference in amplitude between the positive and negative going values of the A.-C. component.

In FIG. 1 this is shown as a winding 32 inserted in series with the meter. This winding is energized by an alternating current which preferably should be excited from the same source as the winding 15 in the grid circuit.

It will be apparent that, when so excited, the ends of the winding 32 will alternately become positive and negative in synchronism with the exciting voltage for the grid. It will also be apparent that when this exciting voltage in the coil 32 is supplied to the anode of one rectifier and the cathode of the other such as 26a and 27a, that during a positive excursion of the exciting voltage on the right end of the winding, 25a–26a will conduct and 27a–28a will cease to conduct. At the same time the other end of the winding is negative causing the anode 26 and the cathode 27 to go negative which will cause the rectifier 27–28 to conduct. Therefore, all of the current will now pass through the upper right leg, through the meter and through the lower left leg to the power supply. Obviously the amplitude of the exciting voltage for the coil 32 should be such as to overcome the bias on the diodes to turn them on and off.

On the next alternation and if it be assumed that the voltage was previously moving in a positive direction on the grid and is now going in a negative direction, the situation is the reverse, except that now the current is reduced because the grid is negative and therefore there will be less current flowing.

It should also be understood that there is also present a steady current but that this steady current from the tube by the action above actually appears to the meter as an alternating current and is therefore by-passed by the condenser 45 around the meter.

As previously stated, the unilateral conducting devices, which may be vacuum tubes, germanium or silicon rectifiers or any other type of rectifier, have certain characteristics which are hard to compensate for, and, make it difficult to balance a bridge circuit particularly under varying current conditions. These include the variable and finite forward and backward resistance. Since the variation in forward resistance is of a low order, this being the direction in which the devices usually work, the devices may be selected by a simple process of matching. The backward resistance being of a higher order is practically eliminated as a parameter by shunting each of the devices with a resistance which is of a low order as compared to the measured backward resistance of the tube. In this instance a 10K ohm resistor is shunted across each tube. This resistance is so low, as compared to the internal resistance of the tube in a so-called non-conducting state, as to bring the total backward resistance down to such a relatively low value that the slight differences in the higher range may be ignored. As will later appear they also act as a load which provides current for establishing a threshold bias for the other devices. A still further bias may be obtained if the loading described is insufficient by the provision of a resistance R across the entire bridge to increase the bias current.

Such out-of-balance as may remain in the forward direction can be compensated for by adjusting the swinger 31 on the resistance 30 which is of relatively low resistance such as 2 ohms.

Shunted across the lower bridge rectifiers is a resistance network comprising two 5K resistors 40 and a 10K potentiometer type resistor 41 having a swinger 42 which is connected to the anodes 28 and 28a and to the steady source of adjustable direct current potential 29. The one end of the network connect to the swinger 31 and thence to the anode 26 and cathode 27 and the other end of the network connects to the anode 26a and cathode 27a. This network being across the rectifiers 27–28 and 27a–28a effects the same results as described in connection with the upper rectifiers but may be adjusted to provide the desired balance by moving the swinger 42.

The swinger 31 on the 2 ohm resistor 30 allows the circuit to be balanced on a forward current which may be 100 ma. while the swinger 42 on the resistance 41 enables the complete circuit to be balanced at minimum current drain, the network acting as a balanced load across the rectifier and being in series with the upper rectifiers also balances them.

At this point it may be well to point out that where extreme accuracy is desired the winding 32 may have a square wave voltage generator substituted therefor. It has been found, however, that in the interest of economy the apparatus shown is such an improvement over the prior art as to bring the apparatus within an accuracy range sufficient for all ordinary purposes. It is therefore apparent that the potential applied to the anode of the tube under test is substantially without ripple.

Another thing that detracted from the accuracy was the fact that the conductance curves of the device such as 25–26 to 27a–28a were not completely linear. There is a pronounced curve particularly at the threshold of conductance. The use of the shunting resistors causes the rectifiers to be conducting beyond the lower bend of the conductance curves. The current in this "on" condition eliminates the "knee" of the curve and the applied voltage at 32 biases them alternately to a completely off condition.

FIGS. 2 and 3 illustrate the manner in which the invention may be applied to the circuit of the Barnhart patent supra. In this instance, the constant voltage source 29 is connected to the junction of the resistors $r_1$ and $r_2$. The meter M is provided with the by-pass condenser 45 and the sensitivity control 34. The rectifier tube may have substituted therefor the rectifying devices 101 which may be vacuum tubes or rectifiers of the silicon or germanium type or other semi-conductor devices. In this instance, a bias is provided by the coil 100 which is energized from the same source as the coil 15 in the grid circuit. The function of the apparatus is similar to that described in that as the ends of the coil 100 go positive or negative, the rectifying devices are biased off and on in synchronism with the changes in plate current in the tube under test and the difference in the excursions of current as synchronized with the grid signal is measured in the meter M. Here gain, any undesirable steady currents, which are not a measure of mutual conductance are by-passed around the meter M by the action of devices 101, which convert such currents to alternating current, through the action of the biasing means, that are by-passed by the condenser 45.

It will be, therefore, seen that the main supply voltage 29 replaces the rectified A.C. voltage of Barnhart and that voltage or signal at the coil 100 is not a supply voltage as contemplated by Barnhart but a gating voltage.

FIG. 3 illustrates another embodiment similar to FIG. 2 except that the biasing signal in this instance is applied through the coil 101a in series with the meter, as in FIG. 1. Obviously this coil could be split and sections disposed on each side of the meter. As in FIG. 1, the devices 101 are shunted by resistors 105 and through a balancing resistor 106 to the anode 12. The slider 107 on the resistance 106 enables an accurate balance for minimum currents to be realized while the potentiometer 30 and slider 31 enable the forward resistance at high currents to be balanced, thus enabling the bridge to be balanced for all currents not indicative of mutual conductance.

Figure 4:
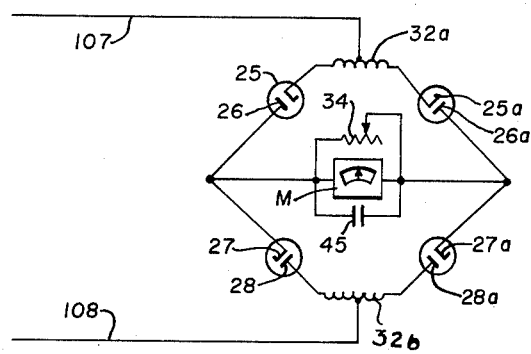
Figure 5:
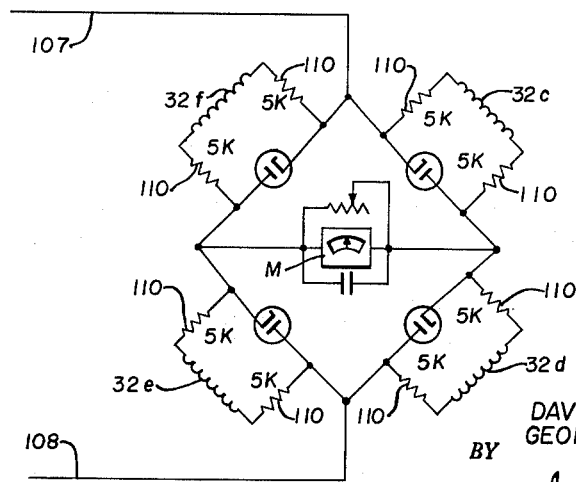

FIGS. 4 and 5 illustrate how the biasing voltage may be applied to the circuit in other manners than illustrated in FIG. 1. They are simplified diagrams in that in the interest of clarity the various balancing resistance have been omitted, as they could be if the components were all substantially perfectly matched. Here the biasing voltages are applied through coils 32a and 32b connected into the adjacent legs of the bridge at the ends, the coils being center tapped and having conductors 107 and 108 connecting to the anode of the tube under test and the constant voltage power supply. As in the previous devices these coils are energized, in the simpler form, by the same source that energizes the grid of the tube being tested and in synchronism therewith. As in the previous embodiments the positive and negative excursions of potential in the coil causes the unilateral conducting devices to be oppositely biased in adjacent legs at the ends and similarly biased in opposite legs in synchronism with the signal on the grid. The action is therefore the same as previously described.

In FIG. 5 there are shown separate coils for biasing each diode or unilateral conducting device, each of which connects to resistances 110 to opposite side of the diode so that the coils shunt the diode. The resistances prevent the diodes from being too heavily loaded by the coil, which could be a short, and also enable, by proper selection, the resistance of each of the diodes to be made substantially the same in the backward direction.

At the same time they provide a current path across which a steady voltage drop is realized that presents a bias voltage for the diodes of a steady nature that causes them to operate above the threshold at all times, the same as occurs in the circuit of FIG. 1. The signals or alternating current applied to the coils in synchronism with the signal on the grid of the tube under test provides an action such as described in FIG. 1.

It will thus be seen that, with the circuit of this invention, it is possible to supply a voltage to the anode of a tube under test which is for all practical purposes a direct current voltage and yet appears to the measuring portion of the circuit as an alternating current to which the measuring device is insensitive because it is an averaging device. It is also apparent that the alternating or fluctuating currents, which are a measure of the mutual conductance, are applied to the measuring device and have their positive and negative portions separated synchronously with the alternating excursion of the grid and the portions due to positive excursion of the grid applied through the meter in one direction and the portion due to the excursion of the grid in the other direction applied through the meter in the other direction. The meter being an averaging device, merely shows the current difference between the two portions of the signal, which indicates the difference directly in micromhos. This type of circuit gives very accurate measurements of mutual conductance because there is substantially no ripple in the plate voltage of the tube under test and because the series resistance in the plate circuit is reduced to a value that is substantially nil. Thus the change in plate current due to the changes in grid voltage and as measured by the meter are a much more accurate indication of mutual conductance than could heretofore be simply, quickly and easily obtained.

Although the power supply 29 is shown in FIG. 1 as being between the cathode and the bridge, it will be apparent that it can also be inserted between the anode and the bridge.

It should be particularly pointed out that the cyclic biasing voltage applied through the winding 32 may be of a very small value. It has been found that a signal as low as .1 volt will operate very satisfactorily. It will further be noted that if a shorter rise time is desired, a higher voltage may be used and that with the insertion of a signal by a square wave generator, the voltage be reduced to a very small figure, the rise time is also reduced to an infinitesimally small figure such that for all intents and purposes the voltage applied to the anode is substantially a direct current voltage with the ripple reduced to a minimum. Again, it should be pointed out that with this arrangement the resistance in the plate circuit is reduced to a point where the IR drop is negligible.

Although the invention has been described in accordance with the known principles of operation as they appear to the inventors today, should it later appear that the results are obtained because of different theories of operation, the invention should not be limited by such description.

Having thus described the invention in some embodiments thereof it will be apparent to those versed in the art that numerous and extensive modifications as well as uses thereof may be made without departing from the spirit of the invention as pointed out in the appended claims.

We claim:

1. An apparatus for connecting a direct current from a direct current source of substantially constant potential to a load including a bridge circuit interposed in series with said source and between said source and the load and including unilateral conducting devices in its opposite legs and cyclic current biasing means connected to said devices for biasing said devices in adjacent legs alternately to conduction.

2. An apparatus for supplying direct current to a load and for measuring an alternating current component thereof including a source of direct current, means in series with said source and the load comprising a bridge circuit having a pair of unilateral conducting devices in at least two legs, alternating current biasing means connected to said unilateral conducting devices for alternately biasing them to conduction and measuring means across said bridge for measuring differences in amplitude of current through the legs.

3. An apparatus for supplying direct current to a circuit and for measuring alternating variations in the current supplied to said circuit comprising a source of direct current voltage, a bridge circuit connected in series between said source of direct current and said circuit, said bridge including at least a pair of legs having unilateral conducting devices therein and alternating current biasing means for alternately biasing said devices to conduction, measuring means disposed across the bridge for measuring the magnitude of said alternating current component in the legs of the bridge.

4. A device as described in claim 3 wherein condenser means is disposed in shunt across said measuring means and is of sufficient value to by-pass direct currents which are converted to alternating currents through the bridge.

5. A device for coupling a source of direct current voltage to a circuit and for measuring the differences in the magnitude of alternating current developed in the circuit comprising a bridge circuit connected in series between the source of direct current and the circuit and including unilateral conducting devices in at least two legs of the bridge, alternating current biasing means connected to said bridge for alternately biasing said devices to a state of conduction, measuring means disposed across said bridge for measuring converted alternating components of said current and means for by-passing converted direct currents around said measuring means comprising a capacity in shunt with said measuring means of sufficiently large capacity to effect said by-passing.

6. An apparatus for supplying direct current to a circuit and for measuring the magnitude of an alternating current component thereof which comprise a source of direct current voltage, a bridge circuit in series with said current source and between said source and said circuit comprising unilateral conducting devices in each leg, and said current source being connected to the one end to a first junction of adjacent legs of the bridge and the circuit to the other end to the opposite junction of the other adjacent leg, a current measuring device connected across the bridge, alternating current means connected to said bridge for alternately biasing the opposite legs to a state of conduction.

7. A device as described in claim 6 wherein a source of alternating current is disposed in series with said current measuring device.

8. A device as described in claim 6 wherein a source of alternating current means is connected in series with the adjacent legs of the bridge.

9. A device as described in claim 6 wherein a source of alternating current means is connected in shunt with each of said unilateral conducting devices.

10. An apparatus for supplying a direct current potential to a load and for measuring alternating current amplitude variations in said load which comprises a source of direct current, a bridge circuit disposed in series with the direct current source and the load and comprising unilateral conducting devices in each leg, with the load connected to one end to a first junction of the legs of the bridge and the source of direct current to the other end to the opposite junction of the legs of the bridge, a measuring device connected across the bridge to the other junctions of the bridge, means for causing alternate conduction through opposite legs of the bridge and said measuring device comprising an alternating source of biasing voltage connected to said unilateral conducting devices, said direct current being passed alternately through said opposite legs and appearing across said bridge as an alternating current, and means in shunt with said measuring device for by-passing substantially all said alternating current, the alternating current in said circuit exterior to said bridge being converted to direct current pulsations in the adjacent legs of said bridge and being measured by said measuring device.

11. A device for coupling a direct current constant voltage source to a circuit and for measuring a fluctuating current in said circuit including a bridge means for connecting said source of constant voltage to said circuit and for measuring said fluctuating current comprising a substantially unilateral conducting device disposed in each leg of the bridge, a measuring means disposed across the bridge and connected to opposite junctions of adjacent legs, means for causing voltage to be supplied alternately through opposite legs of the bridge and to measure alternating current flow through opposite legs comprising an alternating current biasing supply connected to said unilateral conducting devices to bias the opposite legs to and from conduction, by-pass means in shunt with said measuring means for by-passing voltages from said legs that are of alternating character, said measuring means being connected to indicate the magnitude of fluctuating currents flowing through adjacent legs of the bridge, said unilateral conducting devices having a finite backward resistance and means in shunt with each of said devices for equalizing said backward resistance in each device.

12. A device as described in claim 11 wherein a pair of said adjacent legs are connected together by a resistive device and said measuring means is connected to a movable tap on said resistive device to balance currents through said device in a forward direction.

13. A dynamic mutual conductance tube tester comprising a source of constant high voltage direct current potential for the tube under test, a bridge circuit in series with said source of potential and the anode of the tube under test, each leg of said bridge circuit comprising a substantially unilateral conducting device, means for supplying an alternating current signal to the grid of the tube under test for varying the output current from said anode, said bridge circuit including therein a measuring device, said bridge circuit and its measuring device being sensitive to varying current and being insensitive to direct currents.

14. A device as described in claim 13 wherein an alternating current biasing means is connected to said unilateral conducting devices to bias said devices to and from conduction in opposite legs of the bridge simultaneously and in adjacent legs alternately.

15. A device as described in claim 14 wherein said alternating current biasing means is in synchronism with the alternating current voltage supplied to the tube under test.

16. A device as described in claim 14 wherein said alternating current biasing means is disposed in series with said measuring device.

17. A tube tester including a source of constant current potential, means for connecting said current source to the anode of a tube under test comprising a bridge circuit having substantially unilateral conducting devices disposed in each leg, the opposite junctions of adjacent legs at opposite ends of said bridge circuit being connected in series with the anode of the tube under test and with said potential source, a measuring device disposed across the other opposite junctions of adjacent legs of said bridge circuit, biasing means connected to said unilateral conducting devices and arranged to bias said devices in opposite legs for and against conduction cyclically and in adjacent legs in opposite directions, means for applying an alternating current signal to the grid of the tube under test to vary the current drawn by the tube, said biasing means and said signal means being operated in synchronism, the action of said circuit being such as to convert direct current in the circuit to alternating currents and fluctuating currents to direct current and means to by-pass said converted direct current around said measuring device.

18. A tube testing device for determining the dynamic mutual conductance and plate resistance of a tube to be tested wherein the tube to be tested has at least an anode and a control grid, including a direct current anode voltage supply means of constant voltage capacity, means for connecting said voltage supply means to said anode comprising a bridge circuit with at least two adjacent legs having unilateral conductors therein and having its opposite ends, each of which is joined adjacent legs, connected in series with the said voltage supply and said anode and having current measuring means disposed across said bridge and means to bias said unilateral conductors in the adjacent legs alternately to conduction.

19. Apparatus as described in claim 18 wherein said bridge is comprised of four legs each of which has included therein a substantially unilateral conducting device, said devices being connected to conduct current in opposite legs alternately toward the anode of the tube under test.

20. An apparatus as described in claim 19 wherein said bias means alternately biases said conducting devices toward and from a conducting state and connected to bias opposite legs in the same direction and adjacent legs in the opposite direction.

21. An apparatus as described in claim 20 wherein measuring means is connected across said bridge for measuring converted alternating currents through the bridge.

22. An apparatus as described in claim 21 wherein by-passing means is provided for by-passing alternating voltages appearing across said bridge around said measuring means.

23. An apparatus as described in claim 22 wherein biasing means is disposed in series with said measuring means.

24. An apparatus as described in claim 23 wherein means is provided for supplying a cyclically varying voltage to the grid of the tube under test and wherein said biasing means is operated in synchronism with the cyclically varying voltage in said grid.

References Cited by the Examiner

UNITED STATES PATENTS

| | | | |
|---|---|---|---|
| 1,918,495 | 7/33 | Sparks | 324—27 |
| 1,919,284 | 7/33 | Walter | 324—119 X |
| 1,931,763 | 10/33 | Jackson | 324—26 X |
| 1,999,858 | 4/35 | Barnhart | 324—27 |
| 2,117,462 | 5/38 | Thal | 324—57 |
| 2,148,718 | 2/39 | Agins | 321—44 |
| 2,201,764 | 5/40 | Eltgroth | 324—26 |
| 2,363,987 | 11/44 | Muzzey et al. | 324—1 |
| 2,417,609 | 3/47 | Muzzey et al. | 321—36 |
| 2,425,641 | 8/47 | Remde | 324—119 X |
| 2,432,911 | 12/47 | Lieblich | 324—26 |
| 2,440,607 | 4/48 | Hickok | 324—27 |
| 2,704,332 | 3/55 | La Fleur | 321—8 X |
| 2,728,042 | 12/55 | Ruhland | 321—8 |
| 2,829,251 | 4/58 | Patton | 324—87 |
| 2,903,644 | 9/59 | Weiss et al. | 324—26 |

WALTER L. CARLSON, *Primary Examiner.*

LLOYD McCOLLUM, SAMUEL BERNSTEIN, FREDERICK M. STRADER, *Examiners.*

UNITED STATES PATENT OFFICE
CERTIFICATE OF CORRECTION

Patent No. 3,211,995                                      October 12, 1965

David S. Wise et al.

It is hereby certified that error appears in the above numbered patent requiring correction and that the said Letters Patent should read as corrected below.

In the grant line 1, and in the heading to the printed specification, line 6, for "Davis S. Wise", each occurrence, read -- David S. Wise --.

Signed and sealed this 24th day of May 1966.

(SEAL)
Attest:

ERNEST W. SWIDER                                 EDWARD J. BRENNER
Attesting Officer                                     Commissioner of Patents